Figure 6:
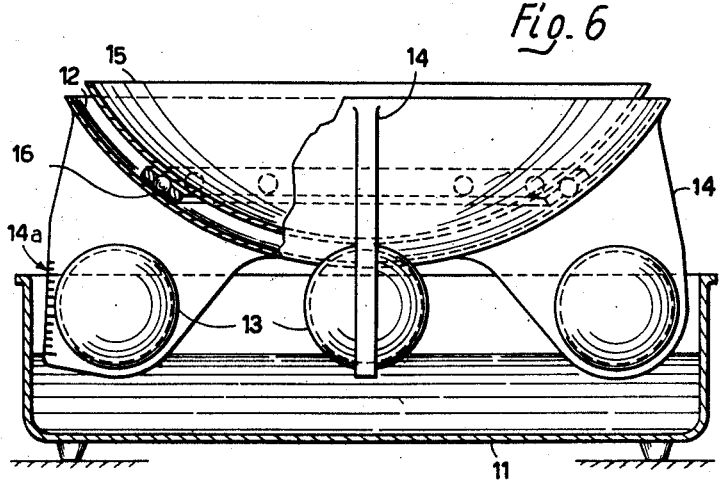

May 10, 1960 L. DI GIORGIO 2,936,164
FLOATING BALANCE
Filed Feb. 18, 1957 2 Sheets-Sheet 1
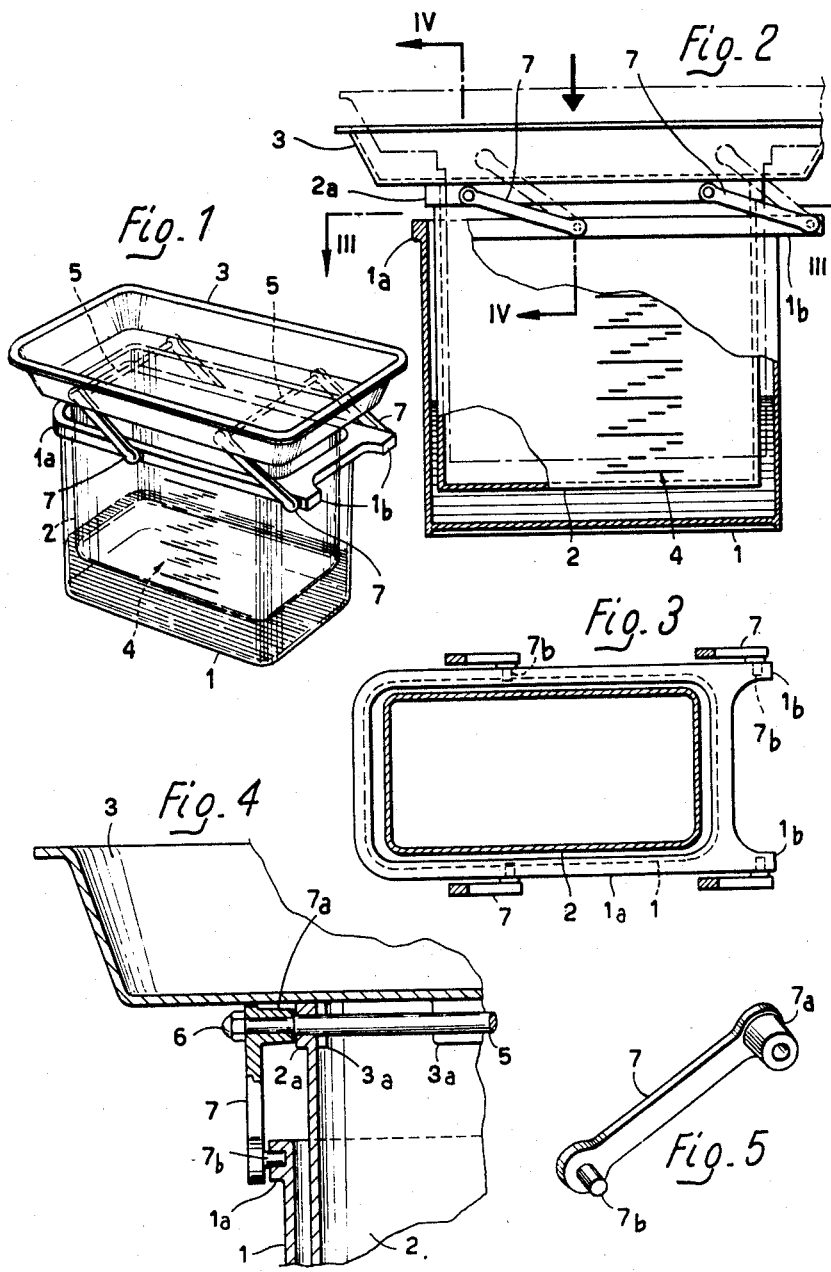
INVENTOR:
LEONARDO DI GIORGIO May 10, 1960   L. DI GIORGIO   2,936,164
FLOATING BALANCE
Filed Feb. 18, 1957   2 Sheets-Sheet 2

INVENTOR:
LEONARDO DI GIORGIO
By
Richardson, David and Nedon
Attys.

United States Patent Office 2,936,164
Patented May 10, 1960

2,936,164
FLOATING BALANCE

Leonardo di Giorgio, Viareggio, Lucca, Italy

Application February 18, 1957, Serial No. 640,865

Claims priority, application Italy February 21, 1956

1 Claim. (Cl. 265—73)

This invention relates to weighing balances and particularly though not exclusively to balances for weighing foodstuffs and the like, especially at home.

According to the present invention there is provided a balance comprising a float designed to float in a liquid contained in a container tank; means on said float for receiving the material, or the objects to be weighed, means for keeping said float substantially parallel to its original position during sinking, and a graduated scale for indicating the weight as a function of the degree of sinking of the float in the liquid.

A guide linkage which may be formed by parallel connecting links between the float and the tank, may be provided in order to obtain a displacement of the float parallel to its original position. Alternatively, there may be provided means to ensure a constancy of position of the resulting force of the load to be weighed with respect to the float, said means may include a container spherically suspended in the float.

In order to make the operation of the balance independent of the amount of liquid contained in the container tank, the graduated scale may be carried by the float in such a way that the reading is effected as a function of the position which the free surface of the liquid assumes with respect to the graduated scale. The origin or zero weight reading of the scale is given by the position of the liquid corresponding to immersion of the unladen float.

In one embodiment the float has substantially the same shape as that of the tank and its dimensions are relatively slightly smaller than those of the tank. A double paralleleogram linkage mutually connects the tank and the float, the parallelogram linkage being formed by two pairs of connecting rods linked to the tank and to the float, the connecting rods of each pair being connected fixedly with respect to each other.

The tank and the float may be substantially parallelepiped in shape.

The tank or a section thereof corresponding to the graduated scale is formed of a transparent material in order to allow the reading therethrough of the position of the liquid level on the graduated scale. The liquid, for instance water, contained in the tank may be appropriately colored in order to facilitate the reading.

The means for receiving the material or object to be weighed may be a hollow container in order to aid automatic centering of the load.

Figure 7:
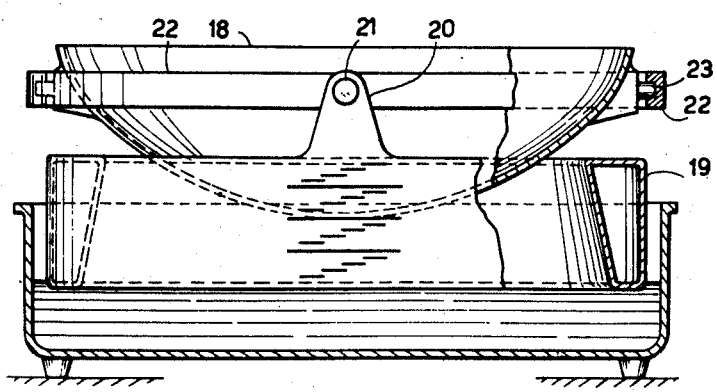

Three embodiments of the invention will now be described by way of example only, reference being made to the accompanying drawings, in which:

Fig. 1 is a perspective view of a balance in accordance with the first embodiment, Fig. 2 is a part sectional side view of the balance shown in Fig. 1, Fig. 3 is a horizontal section taken along the line III—III of Fig. 2, Fig. 4 is a local enlarged section taken along the broken line IV—IV of Fig. 2, Fig. 5 is a perspective view of a small connecting rod forming a part of the parallel linkage which connects the float to the tank, and Figs. 6 and 7 are side views of two further embodiments, partly in section.

Referring firstly to Figs. 1 to 5, it will be seen that in the first embodiment the balance comprises a substantially parallelepiped tank 1 which is provided with an upper reinforced edge 1a and two lugs 1b extending from the longer sides of the reinforced edge 1a.

A float, of parallelepiped shape of substantially the same proportions as the tank 1 but slightly smaller, is located in the tank 1 which contains a limited amount of liquid. The float is formed by a box 2 open at the top where it is provided with a reinforced edge 2a. A plate 3 designed to receive the material or the objects to be weighed, covers the box 2 and is permanently or removably fixed thereto by means of four tags 3a (see Fig. 4) which respectively engage the inner surface of one of the four sides of the edge 2a.

A scale 4 for giving a reading of the weight corresponding to the liquid level is formed on one side of the box 2. In order to obtain accurate weighing of the objects or materials located in any position on the plate 3, there is provided a link between the tank and the float designed to ensure only such displacements of the float as are parallel to its original position. For this purpose, two small shafts 5 parallel to one another rotate in suitable holes formed in the edge 2a. Secured at each end of the shafts 5 by means of nuts 6 are drilled bushes 7a of two small connecting rods 7 which are thus maintained at the same angular inclination by the shafts 5. On each connecting rod 7 at the opposite end of the bush 7a a pin 7b is formed, each of which rotate in corresponding holes two of which are provided in the edge 1a and two in the lugs 1b respectively whereby the connecting rods 7 form a parallelogram linkage connecting the float to the tank 1. By keeping the rods 7 slightly inclined with respect to the horizontal, the float is slightly displaced in a horizontal direction, during movement. By the provision of the lugs 1b the rods 7 on each side can be spaced at an appreciable distance from one another. The insertion of the pins 7b in the corresponding holes may be facilitated by arranging that the rods 7 have sufficient elasticity, the latter being previously assembled on the float 2 by means of the shaft 5.

The immersion line, corresponding to the inherent weight of the float unit, corresponding to the zero mark of the scale 4 so that the scale will indicate the value of the weight of the materials or objects located on the plate 3 as a function of the increased sinking of the float, the reading being given on the scale by the level reached by the liquid on the scale. The dotted lines of Fig. 2 indicate the position of the unloaded float and the full lines show the position of the loaded float. The operation of the balance is independent of the amount of liquid contained in the tank 1; the liquid should only be of such an amount as to keep the connecting rods 7 in the range of an initial angular position required. Owing to the shape and size of the tank and the float, the immersion line of the float rapidly increases with small angular displacements of the connecting rods 7.

Alternatively, the scale may be borne by the tank 1 which then should contain an exact amount of the liquid.

The connection between the float and the tank may be made by means of a different linkage from the one illustrated, for instance, by means of a single central parallelogram linkage or sliding or rolling guide means may be provided, combined with a linkage.

The shapes of the tank and that of the float may also be different from those illustrated; in particular, the float may have its lower end shaped in such a way that the increase of level of the liquid in relation to the float per unit of weight is higher for small weights than for large weights.

The different members may be formed from mouldings of plastic materials, with the exception of the shafts 5 and the nuts 6.

Referring now to Fig. 6, in this embodiment the balance is formed by a tank 11 and by a float including a container 12 and hollow floating bodies 13 connected by supports 14 to the container 12, at least one of the supports 14 forming the graduated scale 14a. The hollow floating bodies are spaced at an appreciable distance from one another in order to allow the maximum possible sinking of the float without any tilting even if the load to be weighed is not perfectly central. In order to facilitate approximate centering of the load, the container 12 is concave, and more particularly may have the shape of a cap of a sphere. In order to ensure centering of the load, a second spherical cap container 15 may be provided which is free to slide in the spherical container 12, rolling means such as a row of balls 16 being advantageously interposed between the containers 12 and 15. In this way the load is suspended with its center in the centre of the spherical surfaces whereby the load is centered and the float always sinks on an even keel.

In the embodiment shown in Fig. 7 a universal suspension is provided for the container 18. The float 19 which is shown as an annular one in this case, carries two flanges 20 which support a ring 22 by pins 21. The container 18 is suspended from the ring 22 by means of pins 23. The container 18 is concave so that the load to be weighed is located under the centre of suspension, defined by the axes of the pins 21 and 23.

As mentioned above, the drawings only show some possible embodiments of the invention which is not restricted to the forms described above.

What I claim is:

A floating balance comprising, in combination, a liquid containing tank of substantially rectangular cross-section and having an upper circumferential edge lying substantially in a horizontal plane, a pair of lug members, extending outwardly of said upper edge from one end of said tank in a horizontal direction, one extending from each side of said one end of said tank, said lug members forming continuations of the major lengths of said edge, a box-shaped float, rectangular in horizontal cross-section and of smaller size than the internal size of said tank disposed within said tank, said float being open at its upper end and having an upper peripheral edge lying substantially in a horizontal plane, a balance plate disposed upon said float and having means cooperative with said edge of said float for locating it in fixed horizontal position with respect to said float, a pair of parallel spaced shafts extending transversely through openings in the major lengths of the peripheral edge of said float, a first pair of elongated connecting rods connected at one end to one each of the ends of one of said shafts, a second pair of elongated connecting rods of the same length as said first pair of connecting rods and connected at one end to one each of the ends of the other of said shafts, pivot means interconnecting the other ends of said first pair of connecting rods with one each of said lug members, pivot means interconnecting the other ends of said second pair of connecting rods one each to opposed portions of the major lengths of the peripheral edge of said tank, said pivot means being spaced by the same distance as the spacing between said shafts whereby a parallel motion guide mechanism is provided between said float and said tank and a graduated scale on said float for determining the degree of immersion of said float in said fluid, the wall of said tank being transparent for viewing said scale through said tank.

References Cited in the file of this patent

UNITED STATES PATENTS 2,545,923   Jackson _____ Mar. 20, 1941

FOREIGN PATENTS 468,629   Italy _____ Jan. 28, 1952